US005993924A

United States Patent [19]

Deroch et al.

[11] Patent Number: 5,993,924

[45] Date of Patent: Nov. 30, 1999

[54] COATING OF METAL SURFACES, ITS APPLICATION TO TUBES AND TO CABLES

[75] Inventors: Maxime Deroch, Bernay; Evelyne Bonnet, Lamorlaye; Jean-Jacques Flat, Serquigny, all of France

[73] Assignee: Elf Atochem S. A., France

[21] Appl. No.: 08/901,412

[22] Filed: Jul. 28, 1997

[30] Foreign Application Priority Data

Jul. 30, 1996 [FR] France .................................. 96 09559

[51] Int. Cl.[6] ............................. B32B 1/08; B32B 15/08; B32B 27/40

[52] U.S. Cl. .................................. 428/36.91; 174/120 R; 174/120 C; 174/120 SR; 428/378; 428/398; 428/421; 428/423.5; 428/423.7; 428/424.2; 428/424.4; 428/424.8; 428/425.8

[58] Field of Search ................................ 428/36.91, 421, 428/423.5, 423.7, 424.2, 424.4, 424.8, 425.8, 378, 379, 380, 383, 397, 398; 174/120 R, 120 C, 120 SR

[56] References Cited

U.S. PATENT DOCUMENTS

| | | | |
|---|---|---|---|
| Re. 30,006 | 5/1979 | Sakayori et al. | 427/375 |
| 3,752,693 | 8/1973 | Suetsugi et al. | 427/388.2 |
| 4,379,807 | 4/1983 | Otis et al. | 428/383 |
| 4,533,598 | 8/1985 | Downey et al. | 428/380 |
| 4,692,383 | 9/1987 | Schmitt et al. | 428/414 |
| 4,734,545 | 3/1988 | Susuki et al. | 174/120 SR |
| 4,810,321 | 3/1989 | Wank et al. | 156/244.23 |

FOREIGN PATENT DOCUMENTS

| | | |
|---|---|---|
| 54209 | 6/1982 | European Pat. Off. . |
| 54210 | 6/1982 | European Pat. Off. . |
| 248310 | 12/1987 | European Pat. Off. . |
| 254194 | 1/1988 | European Pat. Off. . |
| 185058 | 10/1991 | European Pat. Off. . |
| 2091655 | 1/1972 | France . |
| 2739113 | 3/1997 | France . |
| 3422920 | 1/1985 | Germany . |

OTHER PUBLICATIONS

French Search Report dated Apr. 10, 1997.

*Primary Examiner*—D. S. Nakarani
*Attorney, Agent, or Firm*—Bell, Boyd & Lloyd

[57] ABSTRACT

The invention relates to a coated metal surface including successively, starting at the metal, at least one layer of polyurethane and at least one layer of thermoplastic polymer, it being possible for a binder to be placed between the polyurethane and the thermoplastic polymer.

It is useful for covering pipes, electrical cables, telecommunication cables and stay wires.

5 Claims, No Drawings

COATING OF METAL SURFACES, ITS APPLICATION TO TUBES AND TO CABLES

FIELD OF THE INVENTION

The present invention relates to a coating for a metal surface and to its application to tubes and to cables; it relates more particularly to a coating including successively, starting at the metal, a layer of polyurethane and a layer of thermoplastic polymer, it being possible for an adhesion binder to be placed between the polyurethane and the thermoplastic polymer.

The objective of the invention is a coating:

which exhibits good adhesiveness, which can be reflected, for example, in the peel strength, which exhibits good shear strength (that is to say resistance to axial forces), which exhibits good flexibility and good elasticity, and which resists corrosion.

The present invention is useful, for example, for coating the external surface of pipes and for coating electrical or telephone cables or metal cables such as stay wires.

BACKGROUND OF THE INVENTION

DE 3 422 920 describes coatings for steel pipes, including successively a layer of epoxy resin, a layer of grafted polypropylene and finally an external layer of a mixture of polypropylene and of a polypropylene/polyethylene block copolymer. The glass transition temperature (Tg) of the epoxy resin is between 80 and 94° C. These coatings are suitable for hot water at 90° C.

Re 30 006 describes coatings for steel pipes, including successively an epoxy resin and a polyethylene modified by grafting or copolymerization with maleic anhydride.

Epoxy resins are not flexible enough and are not perfect for protection against moisture.

EP 185 058 describes telecommunication cables coated with polyurethanes for protection against moisture, but these cables do not have a thermoplastic coating.

DESCRIPTION OF THE INVENTION

By virtue of this shear strength, the coatings of the invention exhibit a very high cohesion; thus, in the case of an electrical cable which must withstand the forces of its own weight or support the weight of connection boxes or other instruments, it is necessary that the forces transmitted through the thermoplastic polymer layer should be capable of being distributed throughout the cable, including within the metal core. It is also useful that, when two electrical cables are connected, the connection box should be able to bear on the external coatings of the two cables to be connected without this resulting in a loss of cohesion within the cable and that the forces such as the tensile forces on the cables can thus be transmitted. It is then possible to make the connection by stripping the cable bare as little as possible. Electrical cables must also withstand being wound; this is why it is important that the coating according to the present invention should exhibit good flexibility.

The same applies in the case of metal cables which can transmit forces via their coating.

The invention is useful for the individually protected strands of civil engineering works which are suspended.

Individually protected strands are known which comprise a number of twisted steel wires surrounded by an external sheath made of flexible plastic, the twisted steel wires leaving interstitial spaces within this sheath which are filled with a protecting material.

These individually protected strands are usually employed for producing bridge stay wires and have been found particularly effective for protecting these stay wires against corrosion.

The protecting material employed in these individually protected strands of the prior art generally consists of wax or of grease, with the result that these individually protected strands cannot efficiently transmit high axial forces from their external sheath towards their twisted steel wires.

This is the reason why such individually protected strands cannot be employed for producing the cables which carry suspension bridges, suspended roofs or other suspended structures, because such carrier cables must take up, by friction, forces which are directed parallel to their axis, forces that are transmitted by cable clamps from which a civil engineering structure is suspended by means of suspenders.

Carrier cables made up of bundles of wires or of bare steel strands are therefore resorted to in suspension bridges or suspended roofs. These carrier cables are surrounded by an external protecting layer which may consist of paint, of bitumen or a tubular sheath, but this protecting layer is interrupted at the clamps which are tightened directly onto the steel.

This configuration has the following serious disadvantages:

the clamps must be tightened very firmly onto the carrier cables, on the one hand on account of the mediocrity of the steel-on-steel friction coefficient and, on the other hand, to limit the relative movements between the steel wires, which give rise to wear and fatigue due to fretting corrosion (also called "fatigue induced by small motions" or "wear induced by small motions"): this intense tightening requires clamps which are very long (for example up to 2 metres) and massive, tightened using many bolts, fatigue phenomena due to fretting corrosion are never completely avoided, and this in turn results in loosening of the clamps and rupture of the wires constituting the carrier cable, and chemical corrosion phenomena are extremely frequent.

Prior art FR 2739113 has proposed to coat the strand and to fill the spaces between the metal wires with polybutadiene and then to coat the strand with a polyethylene sheath, a grafted polyethylene being placed to reinforce the bonding between the polybutadiene and the polyethylene sheath.

By virtue of this arrangement the axial forces are transmitted efficiently from the external sheath of the strand as far as its twisted steel wires, both by surface adhesiveness and shape adhesiveness of the polybutadiene to the external sheath and to the twisted steel wires, and by the shear strength of the polybutadiene.

In addition, when such individually protected strands are employed to form the carrier cables of a bridge or other suspended structure, it is no longer necessary to tighten the suspended clamps as forcibly as in the prior art, since the sheaths of the individually protected strands exhibit a good friction coefficient.

In addition, fatigue phenomena due to fretting corrosion are avoided since there is no longer any direct contact between the steel wires of one strand and another.

Finally, a carrier cable made up of strands according to the invention withstands chemical corrosion perfectly.

However, polybutadiene must be vulcanized in order to exhibit good aging resistance and to retain an elastomeric character, to avoid the entry of water into the strands while continuing to ensure mechanical bonding with the polyethylene sheath.

Once vulcanized, polybutadiene is no longer thermoplastic; it must therefore be vulcanized after the strand has been coated, and this is very complicated. The coating of the present invention is much simpler; the polyurethane is formed during the coating of the metal surface, adheres better to the metal surface, is completely hydrophobic and completely fills all the space between the bundles of wires or of bare steel strands. The present invention also relates to the device including these bundles of wires or coated steel strands forming a cable and surrounded by a metal clamp consisting of two substantially hemicylindrical shells which are tightened around the cable by means of bolts, the said clamp is provided with at least one hook.

The present invention is therefore a coated metal surface including successively, starting at the metal: at least one layer of polyurethane and at least one layer of thermoplastic polymer, it being possible for a binder to be placed between the polyurethane and the thermoplastic polymer.

The metal surface may be, for example, an electrical or telephone cable, the external surface of a pipe or a stay wire. Where cables or stay wires are concerned, the metal part may be circular in section or may be a group of cables of circular section, as is common in electrical cables or stay wires.

A stay wire is intended to mean metal cables employed for their tensile strength and generally made up of a number of components of circular section which are twisted. They may be from a few millimetres to several centimetres in diameter. Several cables made up of twisted components may themselves be combined to form a single stay wire.

The metal may be steel, copper, aluminium, zinc, stainless steel or their alloys, or even is galvanized steel.

The surface may be either a simple surface such as the external surface of a pipe, or the result of a number of twisted components or the assembly of cables, themselves made up of a number of twisted components. This surface is therefore covered with at least one layer of polyurethane.

The polyurethane is advantageously arranged so as to cover the whole surface or the surfaces of the various components and so that essentially a cylinder whose external surface is polyurethane is obtained. The advantage of polyurethane is that it covers the metals well and that in the case of complex surfaces like the twisted components it penetrates through the core of the cable or of the stay wire. Hydrophobic polyurethanes are preferably employed. These polyurethanes are resistant to acidic, basic or saline aqueous solutions and to hydrolysis. They exhibit good electrical insulation, adhere to metals and retain some flexibility between −65° C. and +100° C. Polyurethanes are the result of the reaction of at least one polyol with at least one polyisocyanate and optionally a chain-lengthener.

The polyols which can be employed in the present invention can be chosen from polyesterpolyols, polyetherpolyols, polythioetherpolyols, polyacetalpolyols, polycarbonatepolyols, polyesteramidepolyols, polyamidepolyols, polydienepolyols and the mixture of at least two of the abovementioned polyols.

Polyesters carrying hydroxyl groups which will be mentioned are the products of reaction of polyvalent, preferably divalent, alcohols optionally accompanied by trivalent alcohols, and of polyvalent, and preferably divalent, carboxylic acids. Instead of free polycarboxylic acids it is also possible to employ for the preparation of the polyesters the anhydrides of corresponding polycarboxylic acids or esters of polycarboxylic acids and of corresponding lower alcohols and their mixtures. The polycarboxylic acids may be of aliphatic, cycloaliphatic, aromatic and/or heterocyclic nature and optionally substituted, for example with halogen atoms, and/or saturated.

By way of illustration of such carboxylic acids and derivatives there will be mentioned: succinic, adipic, suberic, azelaic, sebacic, phthalic and trimellitic acids, phthalic, tetrahydrophthalic, hexahydrophthalic, tetrachlorophthalic, endomethylenetetrahydrophthalic and glutaric anhydrides, maleic acid, maleic anhydride, fumaric acid, dimerized and trimerized unsaturated fatty acids, optionally mixed with monomeric unsaturated fatty acids like oleic acid, dimethyl terephthalate and bisglycol terephthalate.

Among the polyvalent alcohols there will be mentioned, for example, 1,2-ethanediol, 1,2- and 1,3-propanediol, 1,4- and 2,3-butanediol, 1,6-hexanediol, 1,8-octanediol, neopentylglycol, 1,4-bishydroxymethylcyclohexane, 2-methyl-1,3-propanediol, glycerol, trimethylolpropane, 1,2,6-hexanetriol, 1,2,4-butanetriol, trimethylolmethane, pentaerythritol, quinitol, mannitol, sorbitol, formitol, methylglucoside and also diethylene glycol, triethylene glycol, tetraethylene glycol and higher polyethylene glycols, dipropylene glycol and higher propylene glycols and dibutylene glycol and higher polybutylene glycols. The polyesters may carry carboxyl groups in some end positions. It is also possible to employ polyesters of lactones, for example epsilon-caprolactone, or hydroxycarboxylic acids, for example omega-hydroxycaproic acid.

The polyetherpolyols which can be employed according to the invention, carrying at least 2, in general 2 to 8, preferably 2 to 3 hydroxyl groups, are those of the type known per se which is obtained, for example, by polymerization of epoxides like ethylene oxide, propylene oxide, butylene oxide, tetrahydrofuran, styrene oxide or epichlorohydrin, with themselves, for example in the presence of Lewis catalysts such as $BF_3$, or by addition of these epoxides, preferably of ethylene oxide and of propylene oxide, optionally as a mixture or successively, to starting components carrying reactive hydrogen atoms, like water, alcohols, aqueous ammonia or amines, for example 1,2-ethanediol, 1,3 or 1,2-propanediol, trimethylolpropane, glycerol, sorbitol, 4,4'-dihydroxydiphenylpropane, aniline, ethanolamine or ethylenediamine. Sucrose polyethers or polyethers condensed with formitol or with formose may also be employed in accordance with the invention. Polyethers containing preponderant proportions (up to 90% by weight relative to all the OH groups present in the polyether) of primary OH groups are preferred in many cases.

Polythioether polyols which will be mentioned in particular are the products of condensation of thiodiglycol with itself and/or with other glycols, dicarboxylic acids, formaldehyde and aminocarboxylic acids or amino alcohols. Depending on the nature of the second component, the products obtained are, for example, mixed polythioethers, polythioetheresters or polythioetheresteramides.

By way of illustration of polyacetalpolyols there will be mentioned, for example, those which can be prepared from glycols like diethylene glycol, triethylene glycol, 4,4'-dihydroethoxydiphenyl-dimethylmethane, hexanediol and formaldehyde. Polyacetals obtained by polymerization of cyclic acetals like, for example, trioxane can also be employed in the invention.

By way of illustration of polycarbonates carrying hydroxyl groups there will be mentioned those of a type known per se which are obtained, for example, by reaction of diols like 1,3-propanediol, 1,4-butanediol and/or 1,6-hexanediol, diethylene glycol, triethylene glycol, tetraethylene glycol or thiodiglycol, with diaryl carbonates, for example diphenyl carbonate or phosgene.

By way of illustration of polyesteramidepolyols and polyamidepolyols there will be mentioned, for example, the principally linear condensates obtained from saturated or unsaturated polyvalent carboxylic acids and their anhydrides and saturated or unsaturated polyvalent amino alcohols, diamines, polyamines and mixtures thereof.

It is also possible to employ polyols already containing urethane or urea groups, as well as optionally modified natural polyols like castor oil.

By way of illustration of polydienepolyols which can be employed according to the present invention there will be mentioned hydroxytelechelic conjugated diene oligomers which can be obtained by various processes such as the radical polymerization of a conjugated diene containing from 4 to 20 carbon atoms in the presence of a polymerization initiator such as hydrogen peroxide or an azo compound such as azobis-2,2'-[2-methyl-N-(2-hydroxyethyl) propionamide] or the anionic polymerization of a conjugated diene containing from 4 to 20 carbon atoms in the presence of a catalyst such as naphthalenedilithium.

According to the present invention the conjugated diene of the polydienepolyol is chosen from the group including butadiene, isoprene, chloroprene, 1,3-pentadiene and cyclopentadiene. The number-average molecular mass of the polyols that can be employed may vary from 500 to 15 000 and preferably from 1000 to 3000.

According to the present invention a butadiene-based polydienepolyol will be preferably employed. The polydiene glycol advantageously includes 70 to 85 mol %, preferably 80% of units $$—(—CH_2—CH{=}CH—CH_2—)—$$

and 15 to 30%, preferably 20% of units

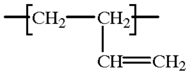

Copolymers of conjugated dienes and of vinyl and acrylic monomers such as styrene and acrylonitrile are also suitable.

It would not constitute a departure from the invention if butadiene hydroxytelechelic oligomers epoxidized on the chain or else hydroxytelechelic hydrogenated oligomers of conjugated dienes were to be employed.

According to the present invention the polydienepolyols may have number-average molecular masses not exceeding 7000 and preferably between 1000 and 3000.

The OH value, expressed in meq/g is between 0.5 and 5; their viscosity is between 1000 and 10 000 MPa s.

Polybutadienes with hydroxyl ends, marketed by Elf Atochem S.A. under the names Poly Bd®R45 HT and Poly Bd®R20 LM will be mentioned by way of illustration of polydienepolyols.

Mixtures of the abovementioned compounds, such as, for example, mixtures of polyetherpolyols and of polydienepolyols, can be employed.

It would not constitute a departure from the invention if polyamine compounds which have a number-average molecular mass $\overline{M}n$ of between 500 and 5000 were to be employed.

Illustrations of such compounds which will be mentioned are polyoxypropylenes ending in $NH_2$ functional groups, polyoxytetramethylenes and polybutadienes ending in $NH_2$ functional groups and butadiene/styrene and butadiene/acrylonitrile copolymers ending in $NH_2$ functional groups.

A chain-lengthener here denotes compounds carrying at least two functional groups which are reactive with isocyanate functional groups.

Hydroxyl functional groups and amine functional groups will be mentioned as examples of such reactive functional groups.

According to the invention the chain-lengthener may be chosen from polyols. The molecular mass may be between 62 and 500.

Illustrations of such compounds which will be mentioned are ethylene glycol, propylene glycol, diethylene glycol, dipropylene glycol, 1,4-butanediol, 1,6-hexanediol, 2-ethyl-1,3-hexanediol, N,N-bis(2-hydroxypropyl)aniline, 3-methyl-1,5-pentanediol and the mixture of at least two of the abovementioned compounds.

Polyamines can also be employed as chain-lengtheners. Their molecular mass may be between 60 and 500.

Illustrations of such polyamines which will be mentioned are ethylenediamine, diphenylmethanediamine diamine, isoporonediamine, hexamethylene diamine and diethyltoluenediamine.

At least one part by weight of one or several abovementioned chain-lengtheners will be employed per 100 parts by weight of polyol used and, preferably, 5 to 30 parts by weight.

A catalyst which may be chosen from the group including tertiary amines, imidazoles and organometallic compounds may be added.

1,4-Diazabicyclo[2.2.2]octane (DABCO) may be mentioned as illustration of tertiary amines.

Dibutyltin dilaurate and dibutyltin diacetate may be mentioned as illustrations of organometallic compounds.

The quantities of catalyst may be between 0.01 and 5 parts by weight per 100 parts by weight of polyol.

The composition according to the invention may additionally contain inert fillers and various additives such as antioxidants and UV stabilizers.

According to the present invention the polyisocyanate employed may be an aromatic, aliphatic or cycloaliphatic polyisocyanate which has at least two isocyanate functional groups in its molecule.

By way of illustration of aromatic polyisocyanate there will be mentioned 4,4'-diphenylmethane diisocyanate (MDI), liquid modified MDIs, polymeric MDIs, 2,4- and 2,6-tolylene diisocyanate (TDI) and their mixture, xylylene diisocyanate (XDI), triphenylmethane triisocyanate, tetramethylxylylene diisocyanate (TMXDI), paraphenylene diisocyanate (PPDI) and naphthalene diisocyanate (NDI).

Among the aromatic polyisocyanates the invention preferably relates to 4,4'-diphenylmethane diisocyanate and very particularly the liquid modified MDIs.

Hexamethylene diisocyanate (HMDI) and its derivatives and trimethylhexamethylene diisocyanate will be mentioned as illustrations of an aliphatic polyisocyanate.

Isophorone diisocyanate (IPDI) and its derivatives, 4,4'-dicyclohexylmethane diisocyanate and cyclohexyl diisocyanate (CHDI) will be mentioned as illustrations of a cycloaliphatic polyisocyanate.

It would not constitute a departure from the scope of the invention to employ isocyanate prepolymers obtained by reaction of an abovementioned polyisocyanate with a polyol such as especially polyetherpolyol, polyesterpolyol and polydienepolyol, or with a polyamine.

The isocyanates are advantageously employed in quantities such that the NCO/OH molar ratio is between 0.3 and 2 and, preferably, between 0.5 and 1.2.

The NCO/OH molar ratio must be calculated by taking account of the presence of the functional groups which are reactive with isocyanate functional groups, such as the hydroxyl and/or amine functional groups, of the chain-lengthener.

It is also possible to add to the polyurethane formulation, that is to say to the mixture of the various ingredients before or during the polymerization, adhesion promoters such as functional silanes, that is to say products which have a trialkoxysilane end and an organic functional group such as amine, epoxy or vinyl, coupling agents such as acids or anhydrides of unsaturated carboxylic acids and inorganic fillers such as calcium carbonate, bubble-suppressors, UV stabilizers, molecular sieves, anticorrosion pigments and flame retardants The optional binder is any product which makes it possible to cause the polyurethane layer and the thermoplastic polymer layer to adhere while imparting a cohesion to the whole, as was explained above, unless the polymer has a good adhesiveness to the polyurethane.

Functionalized polyolefins are advantageously employed.

As examples of a binder there may be mentioned:

- polyethylene, polypropylene, copolymers of ethylene and of at least one alpha-olefin, mixtures of these polymers, all these polymers being grafted with anhydrides of unsaturated carboxylic acids, such as, for example, maleic anhydride. Mixtures of these grafted polymers and of these ungrafted polymers may also be employed;
- copolymers of ethylene with at least one product chosen from (i) unsaturated carboxylic acids, their salts, their esters, (ii) vinyl esters of saturated carboxylic acids, (iii) unsaturated dicarboxylic acids, their salts, their esters, their half-esters, their anhydrides, optionally unsaturated epoxides on condition that the copolymer does not contain any acidic functional group; it being possible for these copolymers to be grafted or copolymerized.

Polyolefins grafted with maleic anhydride are advantageously employed.

By way of illustration of such copolymers there may be mentioned ethylene/alkyl (meth)acrylate/maleic anhydride or acrylic acid copolymers;

- ethylene/alkyl (meth)acrylate/unsaturated epoxide such as glycidyl (meth)acrylate;
- ethylene/vinyl acetate/maleic anhydride or acrylic acid;
- ethylene/vinyl acetate/unsaturated epoxide such as glycidyl (meth)acrylate;
- (ethylene/vinyl acetate) grafted with maleic anhydride, acrylic acid or an unsaturated epoxide;
- (ethylene/alkyl (meth)acrylate) grafted with maleic anhydride, acrylic acid or an unsaturated epoxide.

The thickness of this layer of binder may be between 15 and 500 $\mu$m.

As for the layer of thermoplastic polymer, this may be, for example, a polyamide, a polyolefin, a fluoropolymer, a styrene-based resin or a polyester.

The polyamide may be PA-6, PA-6,6, PA-11 or PA-12.

The polyolefin may be a polyethylene, a copolymer of ethylene and of an alpha-olefin, a polypropylene homo- or copolymer or a copolymer of ethylene and of a vinyl ester of saturated carboxylic acid.

The fluoropolymer may be PVDF.

The styrene-based resin may be polystyrene.

The polyester may be PET or PBT.

High density and intermediate density polyethylenes are advantageously employed.

The thermoplastic polymer may also contain a product promoting adhesion to the polyurethane. This product may be the grafted thermoplastic polymer or the abovementioned binder.

The thickness of this layer of thermoplastic polymer is a function of the properties which are sought after; it may be between 1 and 30 mm.

The present invention also relates to a process for the manufacture of these coated surfaces, in which the polyurethane is deposited, before the end of the-polymerization, on the metal surface and the polymerization is then finished optionally by heating, the external surface of the polyurethane layer is heated, and then is covered with the thermoplastic polymer and, next, cooling is applied. The deposition of the polyurethane layer is a function of the nature of the metal surface. If the external surface of a steel pipe is involved, degreasing is advantageously carried out, followed by sandblasting, unless the surface is already galvanized. The same applies to cables such as stay wires. The polyurethane is in the form of at least two liquid portions which are mixed at the time of the application to the metal surface. One of the portions contains the polyol, the other the isocyanate, the third optionally the catalyst. The other ingredients are distributed between the portions, depending on their reactivity and their compatibility. The operation is advantageously carried out at ambient temperature, for example between 10 and 50° C. However, it would not constitute a departure from the scope of the invention if the operation were to be carried out at 60 or 80° C. In general, the reaction between the polyol, the polyisocyanate and the chain-lengthener takes place between 50 and 80° C. in a few minutes. It would not constitute a departure from the scope of the invention to employ a single-component polyurethane system in powder form with heat activation.

Coating of the metal surface with the polyurethane is therefore undertaken and then, when the surface is well coated, heating is applied, to polymerize. For example, in the case of the external surface of a pipe, the polyurethane is deposited (before polymerization) by coating or rolling, or using a flat die producing a continuous tape which is wound around the tube by the rotation of the tube about itself. In the case of an electrical cable or a stay wire, an annular die which deposits the mixture of the two portions around the cable or the stay wire can be employed. If a number of twisted components are involved, the procedure is similar, care being taken to fill well all the interstices between the various components. When the layer of polyurethane has been deposited and polymerized, the deposition of the optional layer of binder and of the thermoplastic polymer is undertaken next. Advantageously, after the polyurethane has been completely polymerized, that is to say that a so-called tack-free period has been reached, its external surface is heated, for example using a tunnel oven or using induction, to a temperature approximately 30 or 40° C. lower than that of extrusion of the binder and then the binder and the thermoplastic polymer are deposited, either by coextrusion in annular dies in the case of small tube diameters or in the case of cables and stay wires, or using flat dies producing tapes which are wound on. Cooling with water is subsequently performed.

EXAMPLES

The following products are employed:

PolyBd®R45 HT: hydroxylated polybutadiene of $\overline{M}n$ equal to 2800 (determined by steric exclusion chromatography), exhibiting a hydroxyl value $V_{OH}$, expressed in milliequivalents per gram (meq./g) of approximately 0.83, a viscosity in mPa s (cp) at 30° C. of 5000 and a relative density of 0.90.

Voranol RA 100: denotes a polyetherpolyol of $\overline{M}n$ 209, hydroxyl value 530 mg KOH/g, viscosity 900 to 1500 mPa s and relative density 1.055 at 25° C.

Calcium carbonate: Omnya 90 T denotes a product of 1.1 μm mean particle diameter.

Silane A 187: denotes a liquid gamma-glycidoxypropyltrimethoxysilane of relative density 1.09 at 250° C. and molecular weight 236.

Isonate 143 M: denotes a modified diphenylurethane diisocyanate of 30 poise viscosity with a relative density at 25° C. of 1.210 and 29.4% NCO.

Orevac 1: denotes a copolymer mixture of ethylene alpha-olefin copolymers grafted with maleic anhydride of MFI1 at 190° C. 2.16 kg and containing 0.5% by weight of maleic anhydride.

HDPE: is a high density polyethylene (Solvay TUB 71).

Example 1

The following polyurethane formulation is prepared.

Polyol: PolyBd®R45 HT 100 g

Maleic anhydride 1 g

Chain-lengthener (short polyol): Voranol RA 100 17.5 g

Filler: calcium carbonate; Omnya 90 T 100 g

Adhesiveness promoter: epoxysilane: Silane A 187 1.1 g

Isonate 143 M (NCO/OH=1.05) 36 g

It is obtained by mixing a first portion containing the polyol, the chain-lengthener, the carbonate, the silane and the MAH and a second portion containing the isocyanate.

The first portion is homogenized and degassed under vacuum (1 hour, 80° C. at an absolute pressure of 1360 Pa). The two solutions are then mixed and the mixture is deposited at ambient temperature (20° C.) on the external surface of a galvanized steel pipe of 115 external diameter, 6.5 mm thickness and 3 m length.

Crosslinking is then allowed to take place.

The thickness of the polyurethane layer is 0.5 to 1 mm.

The tube thus coated with polyurethane is heated to 180° C.–190° C. with the aid of an induction oven and is then covered with a layer of binder (Orevac 1) from 200 to 300 μm thickness and then a layer of 2.50 to 3 mm of HDPE. The binder and the HDPE are each deposited using a flat die producing a continuous tape which is wound around the tube by the rotation of the tube about itself. The coated tube is next cooled with water for 5 minutes.

Peel tests at a temperature of 23° C. according to DIN standard 30670 were carried out. On a sample taken from a coated galvanized steel tube and whose heating temperature before coating with the binder and the HDPE, using induction, was in the region of 190° C. (±5° C.), we obtained a mean peel strength of 175 N/cm. The rupture is cohesive in the polyurethane.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims. The above references are hereby incorporated by reference.

What is claimed is:

1. Coated metal surface of pipes, cables or assemblies of twisted cables or stay wires, electrical cables, or telecommunication cables comprising successively, starting at the metal surface, at least one layer of polyurethane and at least one layer of thermoplastic polymer, a binder layer placed between the polyurethane layer and the thermoplastic polymer layer and bonded thereto, said binder being a polyolefin grafted with anhydride of unsaturated carboxylic acid.

2. Coated surface according to claim 1 wherein a polyol constituting the polyurethane is a polydienepolyol.

3. Coated surface according to claim 2, wherein the polydienepolyol is a polybutadiene with hydroxyl end groups.

4. Metal surface according to claim 1, wherein the binder is a polyolefin grafted with maleic anhydride.

5. Coated surface according to claim 1, wherein the layer of thermoplastic polymer is selected from polyamides, polyolefins, fluoropolymers, styrene-based resins and polyesters.

* * * * *